United States Patent
Redmond

(10) Patent No.: US 12,524,516 B2
(45) Date of Patent: Jan. 13, 2026

(54) MULTI-FACTOR AUTHENTICATION OF INDUSTRIAL ASSETS

(71) Applicant: Schneider Electric Systems USA, Inc., Foxboro, MA (US)

(72) Inventor: James Redmond, Richmond (CA)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 218 days.

(21) Appl. No.: 17/705,838

(22) Filed: Mar. 28, 2022

(65) Prior Publication Data
US 2023/0306099 A1    Sep. 28, 2023

(51) Int. Cl.
*G06F 21/40* (2013.01)
*G06F 21/32* (2013.01)

(52) U.S. Cl.
CPC .............. *G06F 21/40* (2013.01); *G06F 21/32* (2013.01)

(58) Field of Classification Search
CPC ................................ G06F 21/40; G06F 21/32
USPC .......................................................... 726/19
See application file for complete search history.

(56) References Cited

U.S. PATENT DOCUMENTS

| | | | | |
|---|---|---|---|---|
| 11,244,034 | B1* | 2/2022 | Nagappan | G06F 21/316 |
| 2007/0011452 | A1* | 1/2007 | Marquet | H04L 63/105 |
| | | | | 713/168 |
| 2009/0193151 | A1* | 7/2009 | Adams | G06F 21/32 |
| | | | | 726/19 |
| 2013/0036462 | A1* | 2/2013 | Krishnamurthi | G06F 21/31 |
| | | | | 726/19 |
| 2015/0046697 | A1* | 2/2015 | Galpin | G05B 19/0425 |
| | | | | 713/155 |
| 2015/0227732 | A1* | 8/2015 | Doctor | G06F 21/31 |
| | | | | 726/4 |
| 2015/0281279 | A1* | 10/2015 | Smith | H04L 63/08 |
| | | | | 726/1 |
| 2018/0026954 | A1 | 1/2018 | Toepke et al. | |
| 2018/0316671 | A1* | 11/2018 | Brown | H04L 63/0884 |
| 2019/0147153 | A1* | 5/2019 | Bai | H04L 63/0861 |
| | | | | 726/19 |
| 2020/0082108 | A1* | 3/2020 | Griffin | G06F 21/31 |
| 2021/0288805 | A1* | 9/2021 | Lev | H04L 9/3242 |
| 2021/0377018 | A1* | 12/2021 | Lawrence | H04L 9/3271 |
| 2022/0094686 | A1* | 3/2022 | Jain | H04L 63/20 |

FOREIGN PATENT DOCUMENTS

WO          2019191394 A1       10/2019

OTHER PUBLICATIONS

Stouffer et al., Guide to Industrial Control Systems (ICS) Security, NIST Revision 2 (Year: 2015).*
Stouffer et al., "Guide to Industrial Control Systems (ICS) Security, Revision2", National Institute of Technology, May 1, 2025, pp. 1-247.
Extended European Search Report from EP Application No. 23161043. 7, dated Aug. 28, 2023, 11 pages.

* cited by examiner

*Primary Examiner* — Hee Soo Kim
(74) *Attorney, Agent, or Firm* — Stinson LLP

(57) ABSTRACT

A multi-factor authentication method and system enabling secure access to an industrial asset. A higher level of authentication to access a selected privileged operation of the industrial asset requires verification of two or more multi-factor access credentials.

17 Claims, 10 Drawing Sheets

MULTI-FACTOR AUTHENTICATION OF INDUSTRIAL ASSETS

BACKGROUND

Cybersecurity is a key concern for operational technology in critical infrastructure such as pipelines, water/wastewater, electricity, etc. The ability to develop flexible custom applications on a remote terminal unit (RTU) platform, for example, requires developer or systems integrator access to developer features, often at operating system root level. Such access could be used to compromise the operational integrity of the RTU device which may be operating to control a critical infrastructure asset. Tightly securing access to privileged functionality is necessary for run-time integrity, yet such privileged access is required to develop and deploy content. Software-only controls to switch between run-time and privileged modes may be insufficient from a cybersecurity and reliability perspective.

SUMMARY

Aspects of the present disclosure provide the ability to require additional user authentication to access remote terminal unit (RTU) devices, smart sensors, programmable logic controllers (PLCs), and other industrial assets using independent systems. Such aspects secure access to privileged functionality in developer mode and prevent access to privileged functionality in run-time mode. A multi-factor authentication system according to aspects of the present disclosure facilitates the centralized management of credentials in operational technology to ensure user privileges are restricted to active, valid users who need access. Improved security makes remote industrial assets significantly harder targets and, thus, deters cyber-attacks and further protects their operation.

In an aspect, a multi-factor authentication method enables secure access to an industrial asset. The method includes determining a level of authentication required to access a selected operation of the industrial asset and requesting two or more access credentials based on the determined level of authentication. In response to receiving the requested access credentials, the method includes verifying the requested access credentials to determine if the requested access credentials match credentials required to access the selected operation. If the requested access credentials match the credentials required to access the selected operation, access by a user to the selected operation is enabled. If the requested access credentials do not match the credentials required to accessing the selected operation, access by the user to the selected operation is denied.

In another aspect, a system enables secure access to an industrial asset. The system includes an industrial asset having a privileged operational mode and a run-time operational mode. The privileged operational mode requires a higher level of authentication than the run-time operational mode. The system also includes a computing device communicatively coupled to the industrial asset. The computing device is configured to perform one or more functionalities associated with the privileged operational mode in response to verification of two or more access credentials.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
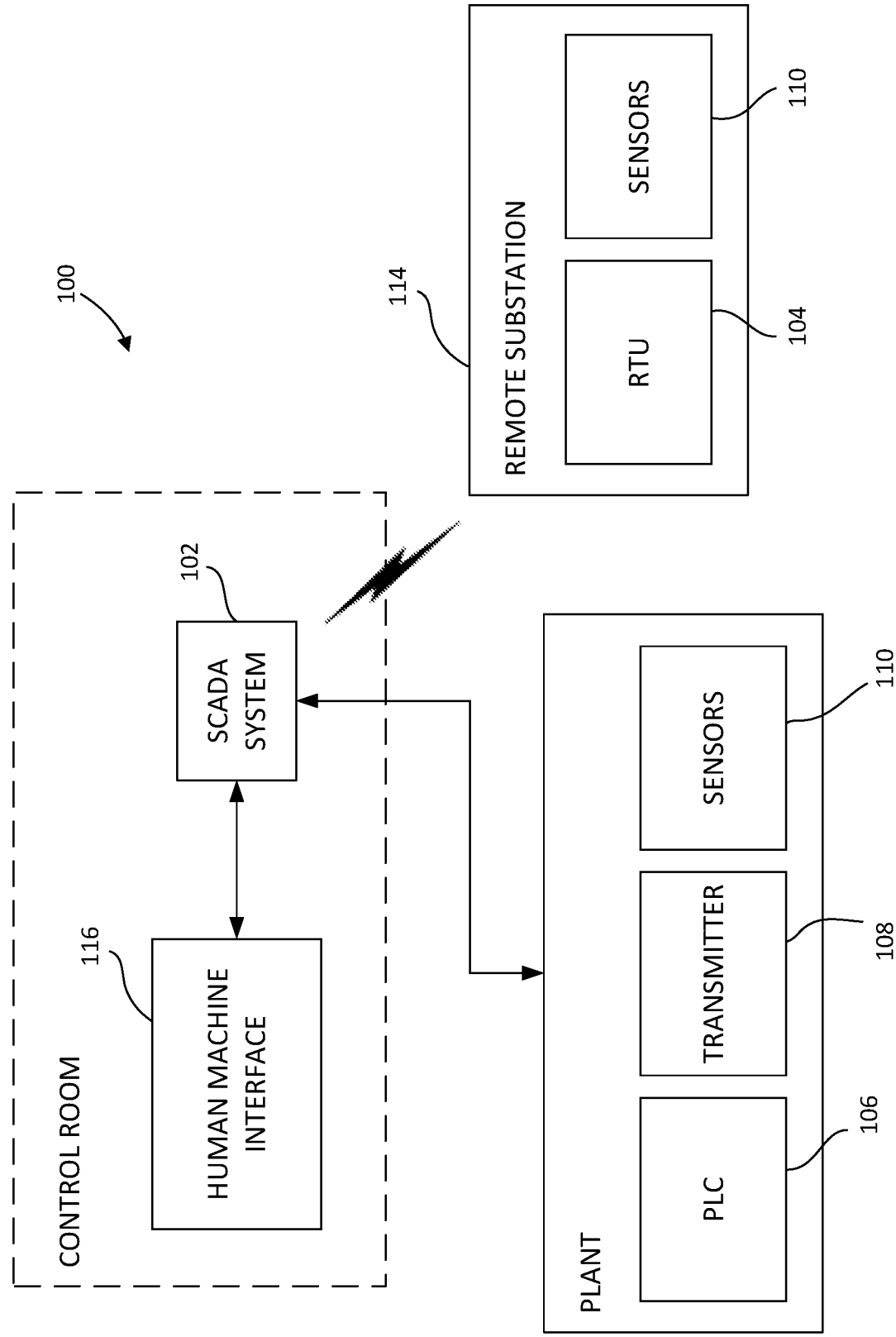
FIG. 1 illustrates an automation system according to an embodiment.
Figure 2:
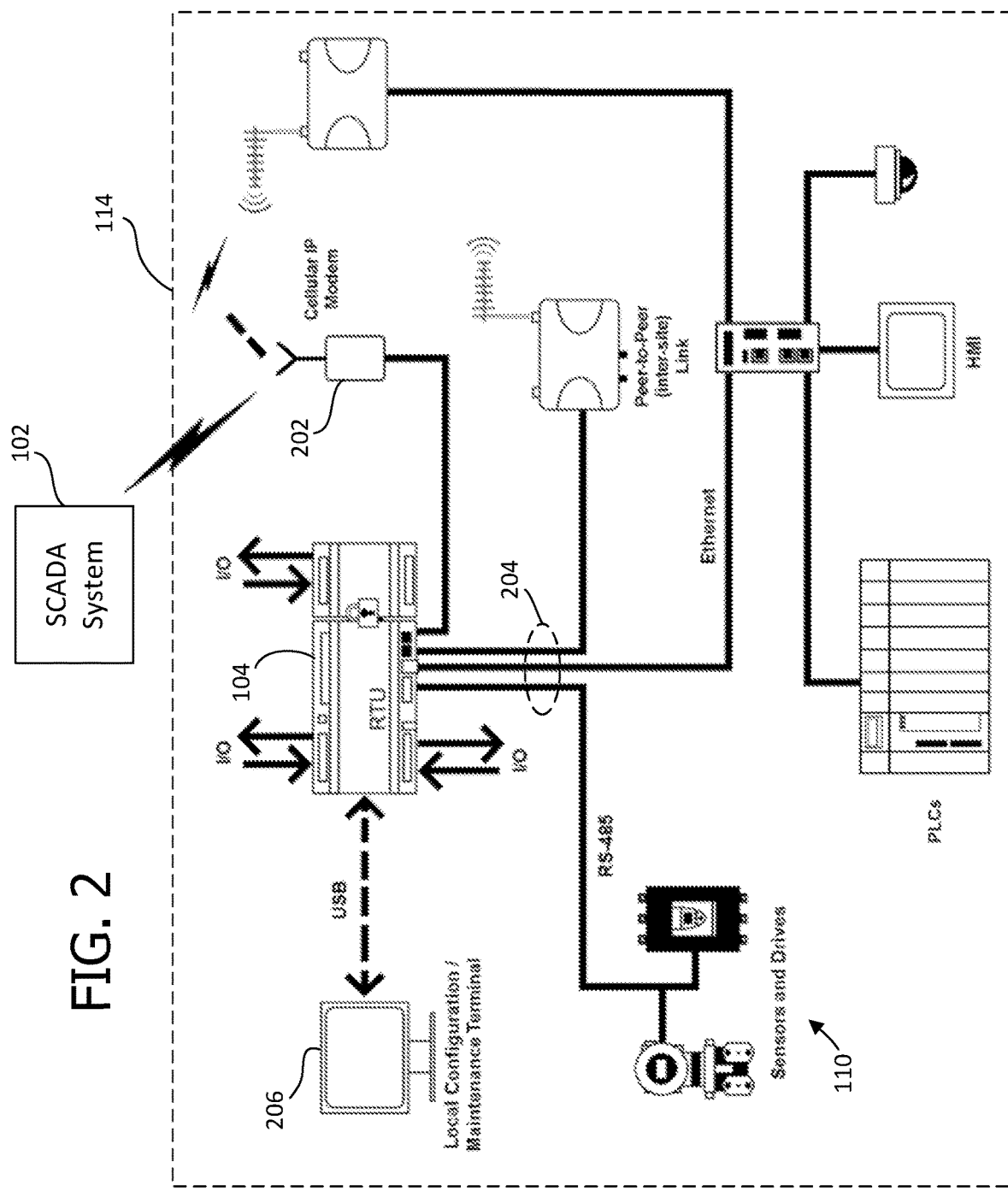
FIG. 2 is a block diagram of a remote substation including a remote terminal unit (RTU) of FIG. 1.

Referring to FIG. 1, a schematic overview of an automation system is generally indicated 100. The automation system 100 includes a Supervisory Control and Data Acquisition (SCADA) system 102 communicating with one or more industrial assets. In the illustrated embodiment, the industrial assets include industrial control and monitoring devices such as a remote terminal unit (RTU) 104, a programmable logic controller (PLC) 106, a multivariable transmitter (MVT) 108, and a peripheral 110 (e.g., sensor, actuator, variable frequency drive, motor controller, pressure transmitter, Coriolis meter, magnetic flow meter, etc.).

The SCADA system 102 of FIG. 1 is coupled to a remote substation 114 via a communications network 202, such as a private data radio network and/or a cellular telephone network. The substation 114 typically includes a number of peripherals 110 and at least one RTU 104 for data acquisition from substation 114 and/or from SCADA system 102. The RTU 104 transmits telemetry data to SCADA system 102 and receives messages back for controlling connected physical objects of remote substation 114.

As shown in FIG. 1, SCADA system 102 operates in conjunction with a human-machine interface (HMI) 116. The HMI 116 is an input-output device that presents process information to a human operator. The SCADA system 102 links to HMI 116 for providing maintenance procedures, detailed schematics, logistic information, trend data, diagnostic data, and the like for a specific sensor or machine. In an embodiment, HMI 116 comprises a personal computer, smartphone, tablet, touchscreen HMI device, or the like. Although illustrated in a control room remotely from the various industrial assets, it is to be understood that HMI 116 could be hosted on the device itself.

In addition to the RTU 104, peripherals 110, and other components of remote substation 114, SCADA system 102 communicates with at least one PLC 106. In a SCADA-based control system, PLC 106 is connected to, for example, a sensor (i.e., peripheral 110) for collecting the sensor output signals and converting the signals into digital data. The SCADA system 102 may also communicate with a transmitter, such as MVT 108, which is used to measure flow, differential pressure, temperature, pressure, and the like.

As described above, cybersecurity is a key concern for operational technology in critical infrastructure such as pipelines, water/wastewater, electricity, etc. The failure to secure access could be used to compromise the operational integrity of an industrial asset, such as RTU 104, PLC 106, MVT 108, peripheral 110, or the like, which may be operating to control a critical infrastructure asset. Aspects of the present disclosure provide the ability to require additional user authentication to access these industrial assets using independent systems. Such aspects secure access to restricted or privileged functionality in developer mode and prevent access to such functionality in run-time mode. A multi-factor authentication system according to aspects of the present disclosure facilitates the centralized management of credentials in operational technology to ensure user privileges are restricted to active, valid users who need access to selected operations, including operational modes, configurations, features, data, etc. Improved security makes remote industrial assets significantly harder targets and, thus, deters cyber-attacks and further protects their operation.

Aspects of multi-factor authentication may be applied to various industrial assets, including one or more of RTU 104, PLC 106, MVT 108, and peripheral 110. For the sake of convenience, however, the description below refers to an example in which the authenticated industrial asset is RTU 104.

In an embodiment, the RTU 104 is used as a control device. A communication bus 204 provides communication for the complete substation 114 and all parts of the substation are accordingly connected thereto, whether directly or indirectly. The RTU 104 is configured to be connected to a computer 208 (e.g., a personal computer, desktop, laptop, workstation machine, etc.) to access and control settings and parameters as well as a real-time database.

The RTU 104 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 104 in an oil and gas application include: tank monitoring and automation; well test automation; Emergency Shut-Down (ESD) at well heads; well production and optimization; and measurement.

In an oil and gas environment, for example, substation 114 is located at a well site to gather data about various aspects of the well site for monitoring and tracking purposes. The substation 114, which acts as a control unit, includes RTU 104 for collecting data on pump motor operation (e.g., motor speed and load). A variable speed drive motor controller, for example, generates this motor data. The RTU 104 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 104 can determine the tension or load (vertical axis) on the rod versus the displacement (horizontal axis) of the rod per stroke or pump cycle (i.e., upward and downward movement). Other data collected by RTU 104 from the field sensors may include fluid flow rate, temperature, pressure, and the like.

In an embodiment, RTU 104 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 104 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU embodying aspects of the present disclosure involves autonomous, remotely located assets, including critical infrastructure assets, where high control system, monitoring, and reporting availability as well as data analytics associated with control systems, asset performance, and custom application features are requested.

Figure 3:
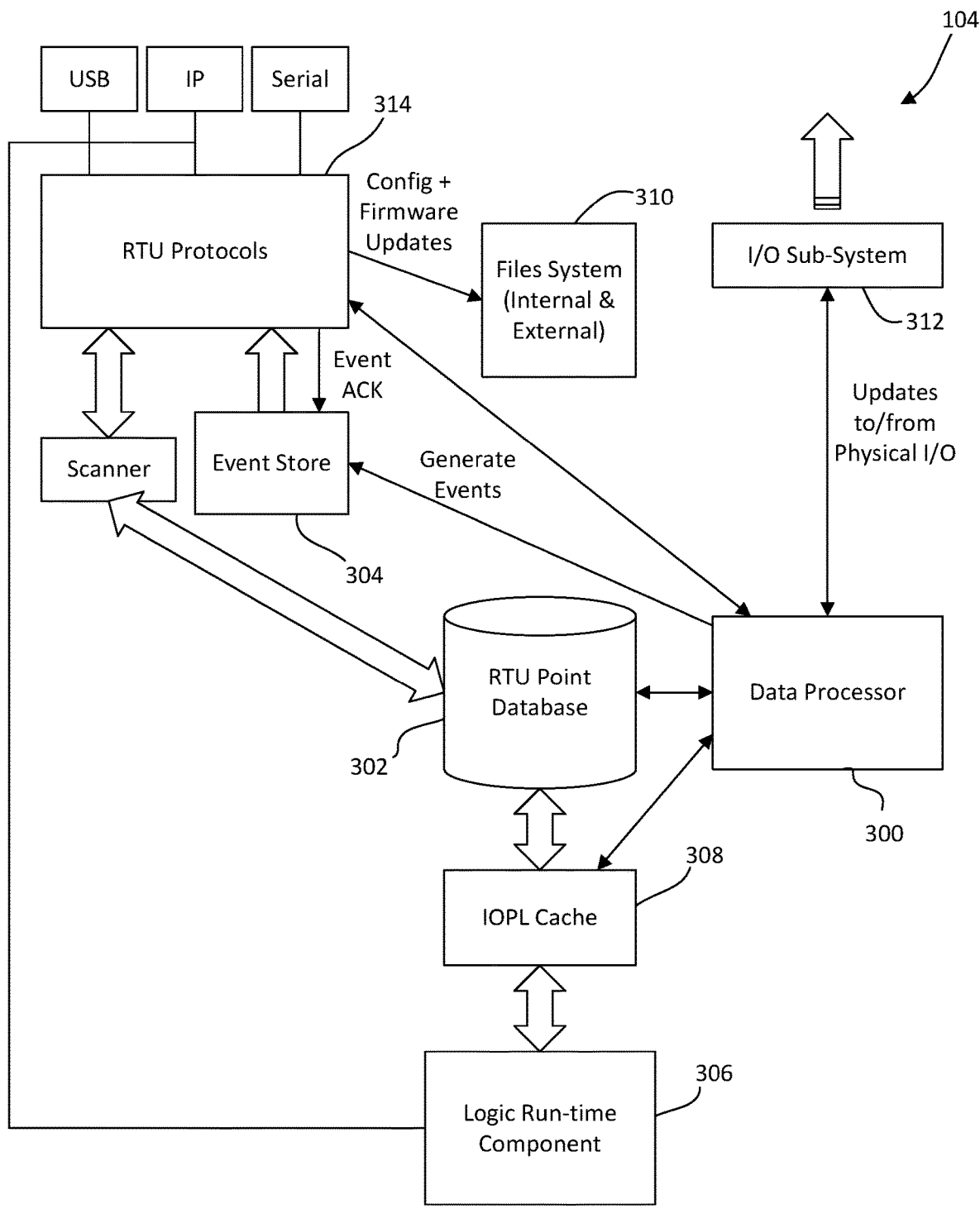
FIG. 3 is a block diagram illustrating an example internal architecture of the RTU of FIG. 2.

FIG. 3 illustrates aspects of an example internal architecture of RTU 104 according to an embodiment. A central processing unit (CPU) 300, indicated in FIG. 3 as a data processor, is the central component by which changes to the status of RTU 104 are managed. The RTU 104 includes a point database 302, an event store 304, a logic run-time component 306, and a cache 308 of the IOPL (i.e., I/O process list, which copies instructions for logic run-time state and end-of-scan data transfers). In the illustrated embodiment, RTU 104 further includes a filesystem 310, an I/O sub-system 312, and a store of RTU protocols 314.

The CPU 300 is responsible for updating the point database 302 based on information from other parts of substation 114, including physical I/O updates from upstream remote protocols via the I/O sub-system 312, local or downstream device data, local run-time logic execution, etc. In an embodiment, the internal systems of RTU 104 manage event storage, with time-stamped data. Events are captured in the event store 304 based on an RTU configuration associated with physical I/O, downstream data sources, and internal data items (including data items coming from logic run-time 306). Events are reported upstream to client stations through remote protocols 314. Confirmation messages from upstream client stations remove successfully delivered events from the RTU event store 304. The filesystem 310 of the RTU 104 provides storage for delivery of data items such as full or incremental configuration, firmware upgrades, logic applications, etc.

In an embodiment, the ability to develop flexible custom applications on an RTU platform requires developer or integrator access to developer features, often at operating system root level. Such access could be used to compromise the operational integrity of RTU 104. Because RTU 104 may be operating to control a critical infrastructure asset, security is important. Tightly securing access to privileged functionality is necessary for run-time integrity, yet such privileged access is required to develop and deploy content. Software-only controls to switch between run-time and privileged modes may be insufficient from a cybersecurity and reliability perspective. For this reason, improved, secure authentication is provided to switch between the modes.

Aspects of the present disclosure provide a mechanism for securing access to restricted or privileged functionality in developer mode and preventing access to the restricted or privileged functionality in run-time mode. A run-time (non-privileged) mode allows user to deploy application content locally or remotely, with content authenticated via local certificate. A privileged mode allows the user to deploy an integrator's certificate via local access (via USB or RTU configuration tool). When not in the privileged mode, running services are dynamically restricted. The RTU 104 can be reverted to secure factory configuration, removing developer's overlay filesystem content and certificates, through a local boot mode. Firmware upgrades are validated for authenticity prior to allowing upgrade (locally or remotely). When the privileged mode is selected on RTU 104, the following services are enabled locally (and require physical presence at RTU 104 with content provided by a security administrator): (a) Load or update integrator security certificate or user security certificate; (b) Load or update signed boot-script (for activating user content that is authorized by a loaded security certificate); and (c) Login to the operating system with root mode access. In an embodiment, the industrial asset includes an embedded processing device configured to access selected operations via a wired protocol (e.g., serial, Ethernet, HART), wireless protocol (e.g., WiFi, Bluetooth, Zigby, LoRAWAN), visually using an electrical or mechanical HMI, etc.

FIGS. 4-7 illustrate example use cases of multi-factor authentication of industrial assets of the automation system of FIG. 1 for access to selected operations and configurations on various control and/or monitoring devices, including RTU 104, PLC 106, MVT 108, and/or peripheral 110 (e.g., a sensor). The secure privilege mode would be analogous to an admin account on a PC allowing operations that could, for example, modify user account information, the logic application, flow computer parameters, etc. A multi-factor authentication system is desirable for the centralized management of credentials in operational technology to ensure user privileges are restricted to active users who need access. As described above, aspects of the present disclosure may be applied to various industrial assets, including one or more of RTU 104, PLC 106, MVT 108, and peripheral 110. For the sake of convenience, however, the description of FIGS. 4-7 refers to RTU 104.

Figure 4:
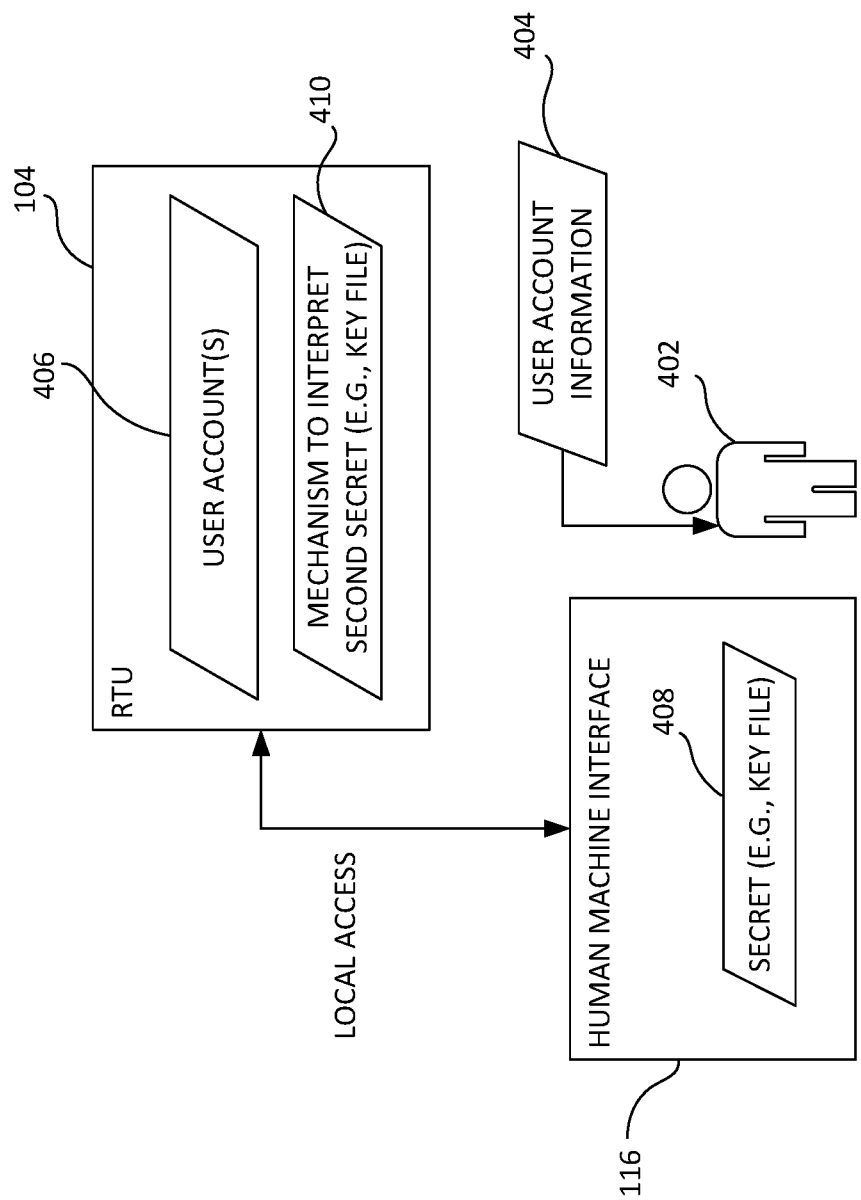
FIGS. 4-7 illustrate example use cases of multi-factor authentication of industrial assets of the automation system of FIG. 1.

Referring now to FIG. 4, a user 402 attempts to access RTU 104 via HMI 116. In the illustrated embodiment, HMI 116 is coupled to RTU 104 via local access in accordance with serial, Ethernet, near field communication (e.g., Bluetooth), local WiFi, radio, or other communication technology. The user 402 enters predetermined user account information 404 using HMI 116. First, the user account information 404 must match corresponding user account information 406 stored at RTU 104 to enable user 402 to login to RTU 104. In addition, RTU 104 in this embodiment requires a second credential 408, such as a one-time-password provided by RTU 104 through methods including an email, SMS message, RFID, a one-time passkey provided by a secure protocol to SCADA system 102 to which the RTU is connected, and the like. In FIG. 4, the CPU 300 of RTU 104 executes processor-executable instructions 410 for interpreting the second credential 408 for authenticating user 402.

Figure 5:
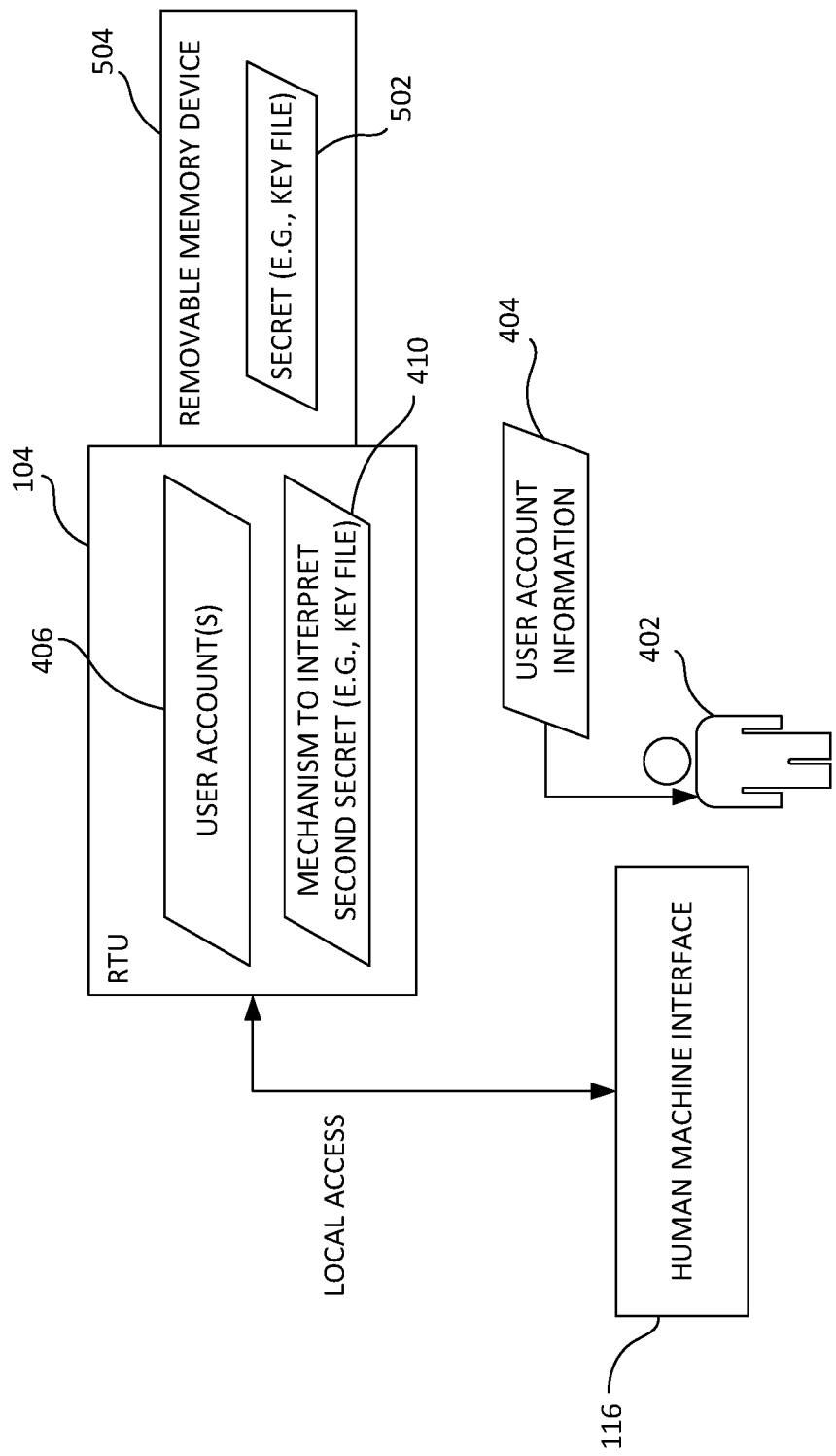

FIG. 5 illustrates user 402 accessing RTU 104 via HMI 116. In the illustrated embodiment of FIG. 5, HMI 116 is coupled to RTU 104 via local access in accordance with serial, Ethernet, near field communication (e.g., Bluetooth), local WiFi, radio, or other communication technology. The user 402 enters predetermined user account information 404 using HMI 116. First, the user account information 404 must match corresponding user account information 406 stored at RTU 104 to enable user 402 to login to RTU 104. In addition, RTU 104 in this embodiment requires a second credential 502, such as a one-time-password or the like, provided via a removable memory device 504 (e.g., smart card, USB drive, SD card, SIM card, etc.). In an embodiment, the second credential 502 comprises a digitally signed key located in a secured enclave, namely, removable memory device 504. In FIG. 5, the CPU 300 of RTU 104 executes processor-executable instructions 410 for interpreting the second credential 502 for authenticating user 402.

Figure 6:
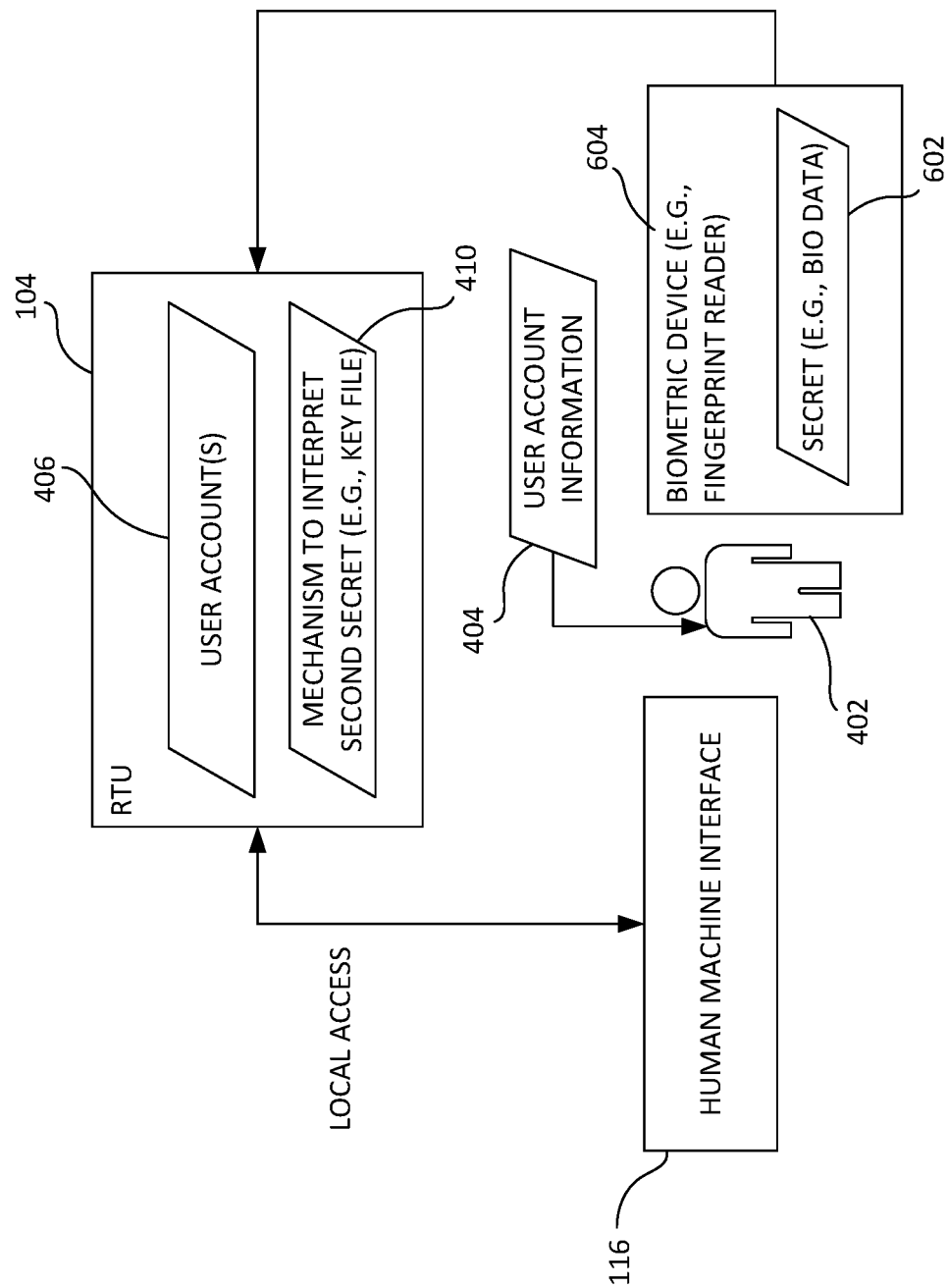

FIG. 6 illustrates user 402 accessing RTU 104 via HMI 116 according to another embodiment. In FIG. 6, HMI 116 is coupled to RTU 104 via local access in accordance with serial, Ethernet, near field communication (e.g., Bluetooth), local WiFi, radio, or other communication technology. The user 402 enters predetermined user account information 404 using HMI 116. First, the user account information 404 must match corresponding user account information 406 stored at RTU 104 to enable user 402 to login to RTU 104. In addition, RTU 104 in this embodiment requires a second credential 602 in the form of biometric data provided by a biometric scanner device 604 (e.g., fingerprint reader). In FIG. 6, the CPU 300 of RTU 104 executes processor-executable instructions 410 for interpreting the second credential 602 for authenticating user 402.

In each of FIGS. 4-7, aspects of the present disclosure require user 402 to enter the correct account information and to provide a second credential in order to access the secure privileged mode. Access to data and configuration within the industrial asset can be designated as privileged such that multi-factor authentication is desired while other, less secure, information is designated as privileged. For instance, the ability to view read-only status data could require only a single credential whereas the ability to update the logic on RTU 104 or PLC 106, for example, would require a second factor to preserve operational security. While two factors authentication is described herein, it is to be understood that authentication could require more than two factors. In an embodiment, a first access credential enables secure access to a first select portion/feature/capability (e.g., read-only capability) of a selected operation, configuration, feature, and/or data stored for which access is requested, and a second and subsequent access credential enables secure access to further select portions/features/capabilities (e.g., write capability) of the selected operation, configuration, feature, and/or data stored for which access is requested.

Figure 7:
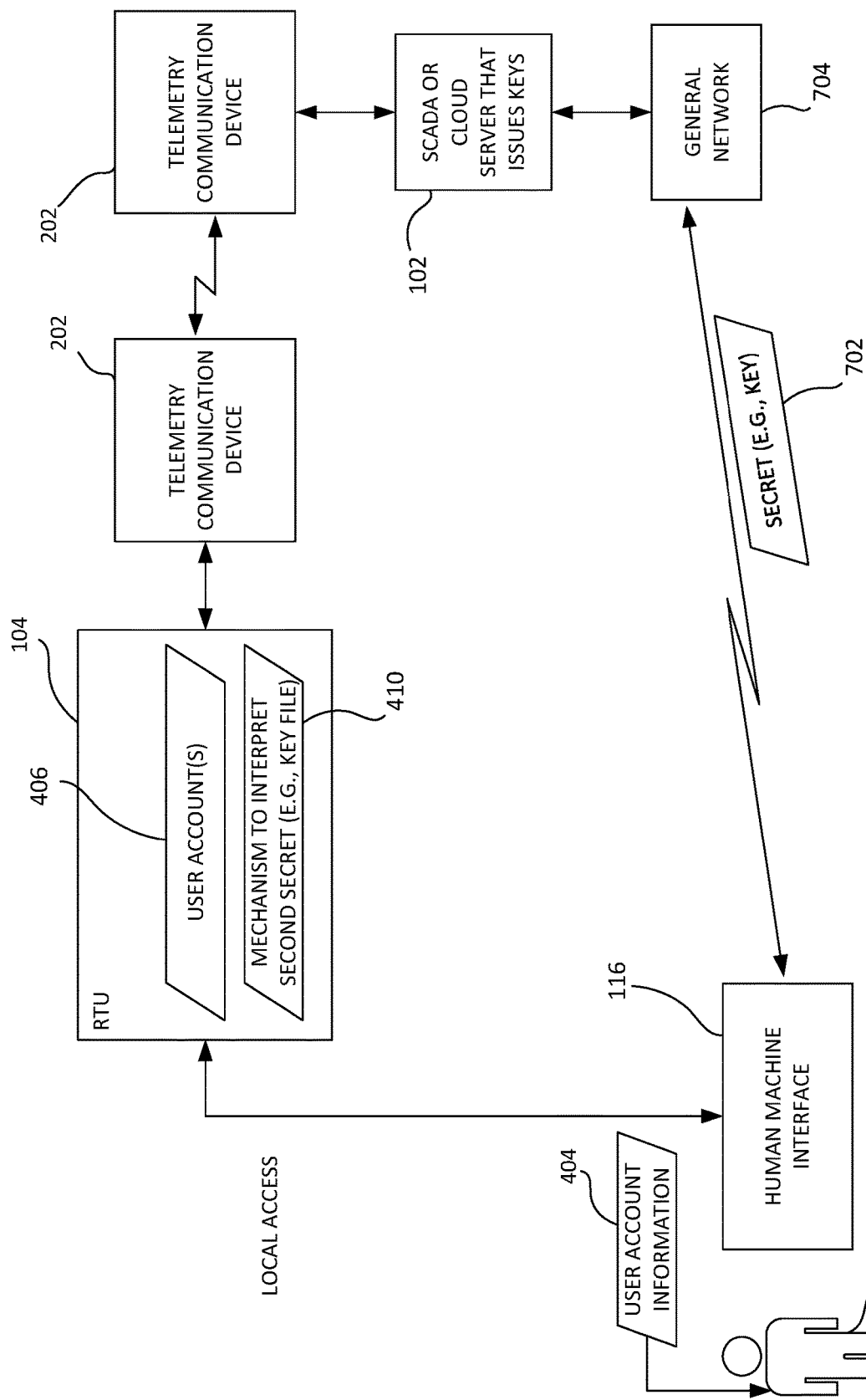

The tight integration of two or more factors to authenticate access to the industrial asset adds significantly to the security. Moreover, the integration of network elements, such as shown in FIG. 7, facilitate the centralized control of who can access these assets and the ability to monitor these systems. In the illustrated embodiment of FIG. 7, for example, telemetry communication devices 202 (e.g., modem, radio, wired connection to telemetry network) couple RTU 104 to SCADA system 102. In turn, SCADA system 102 provides a second credential 702 (e.g., a secret key or one-time password) via a data communication network 704 using email, an SMS message, RFID, a secure protocol to the SCADA system 102, or the like.

Figure 8:
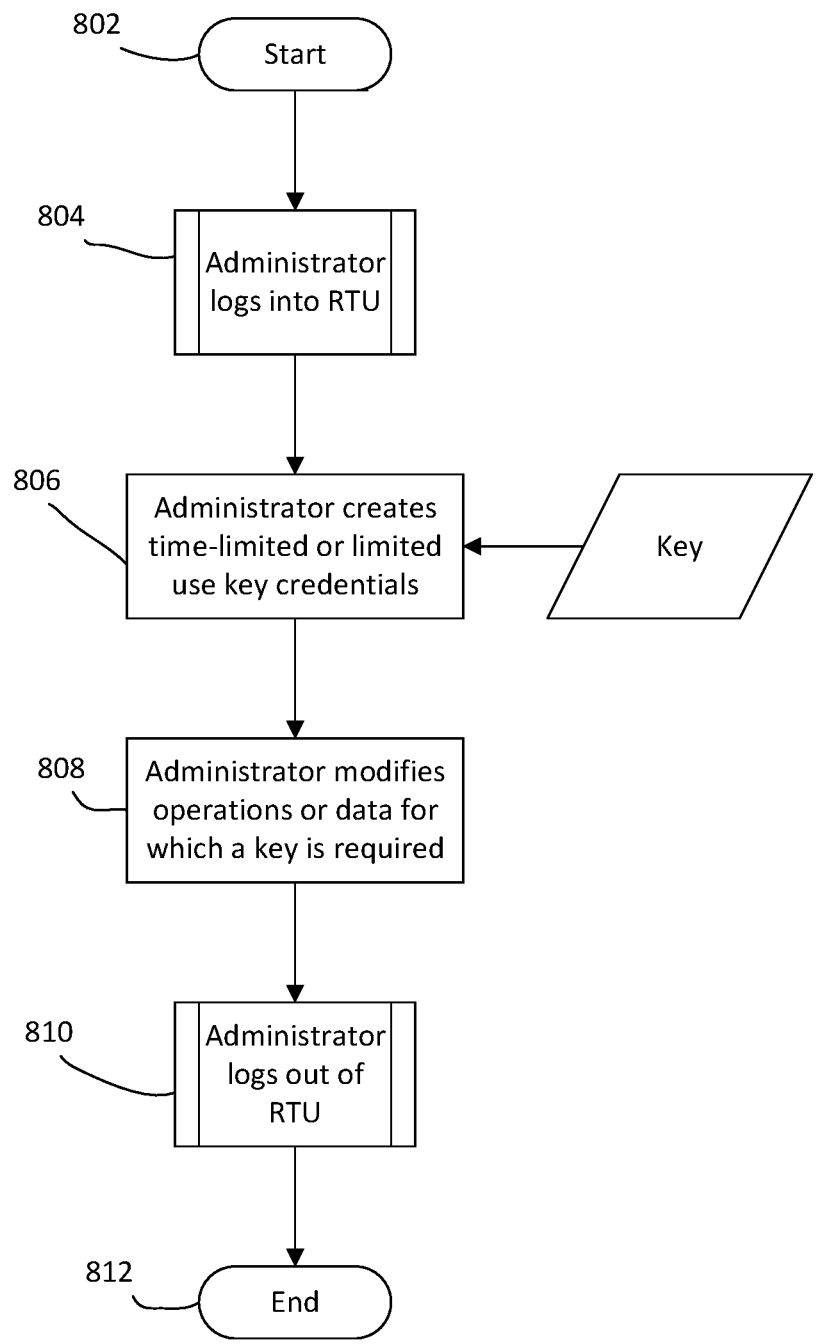
FIGS. 8-10 are flow diagrams illustrating example processes for performing the use cases of FIGS. 4-7.
Figure 9:
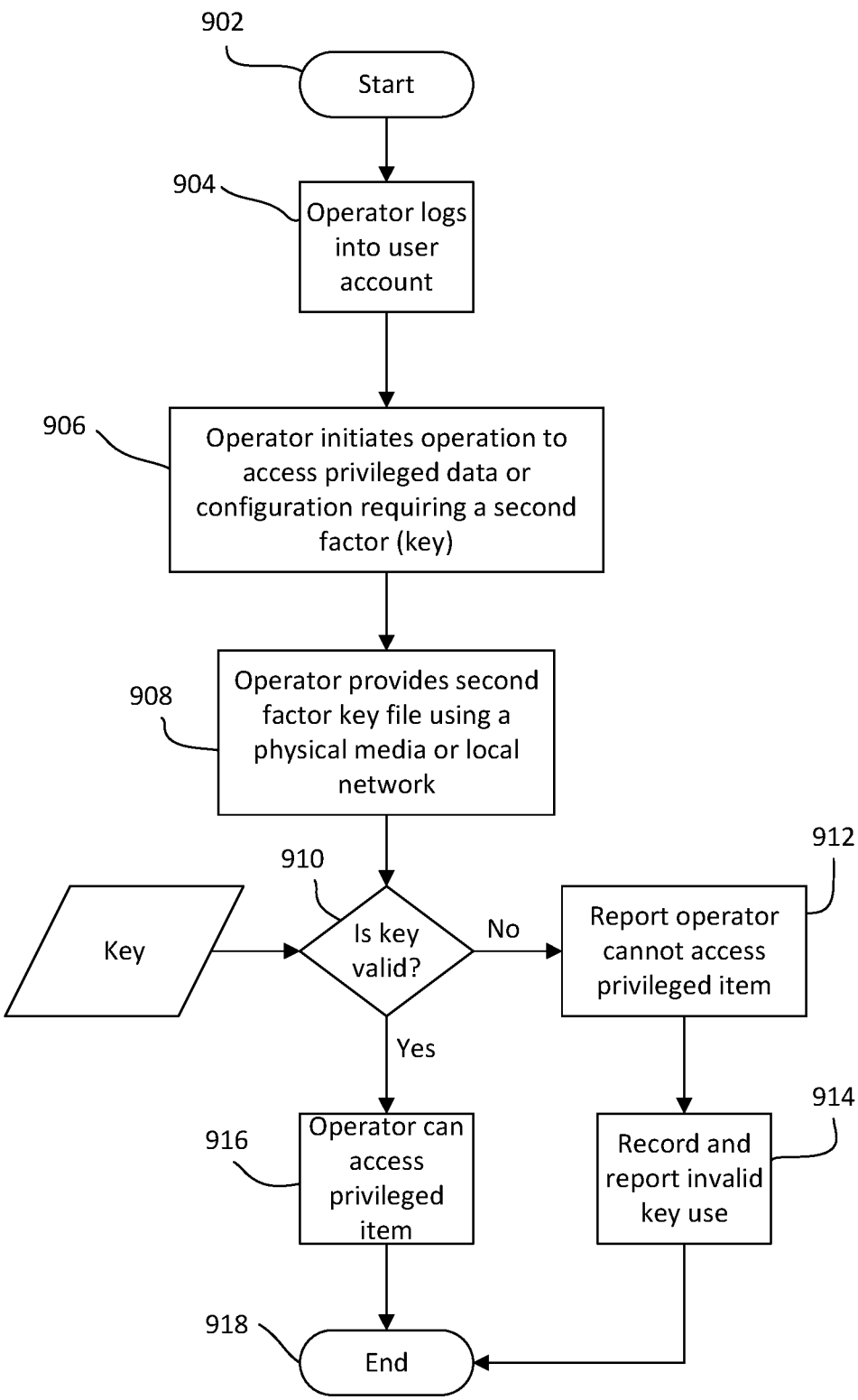
Figure 10:
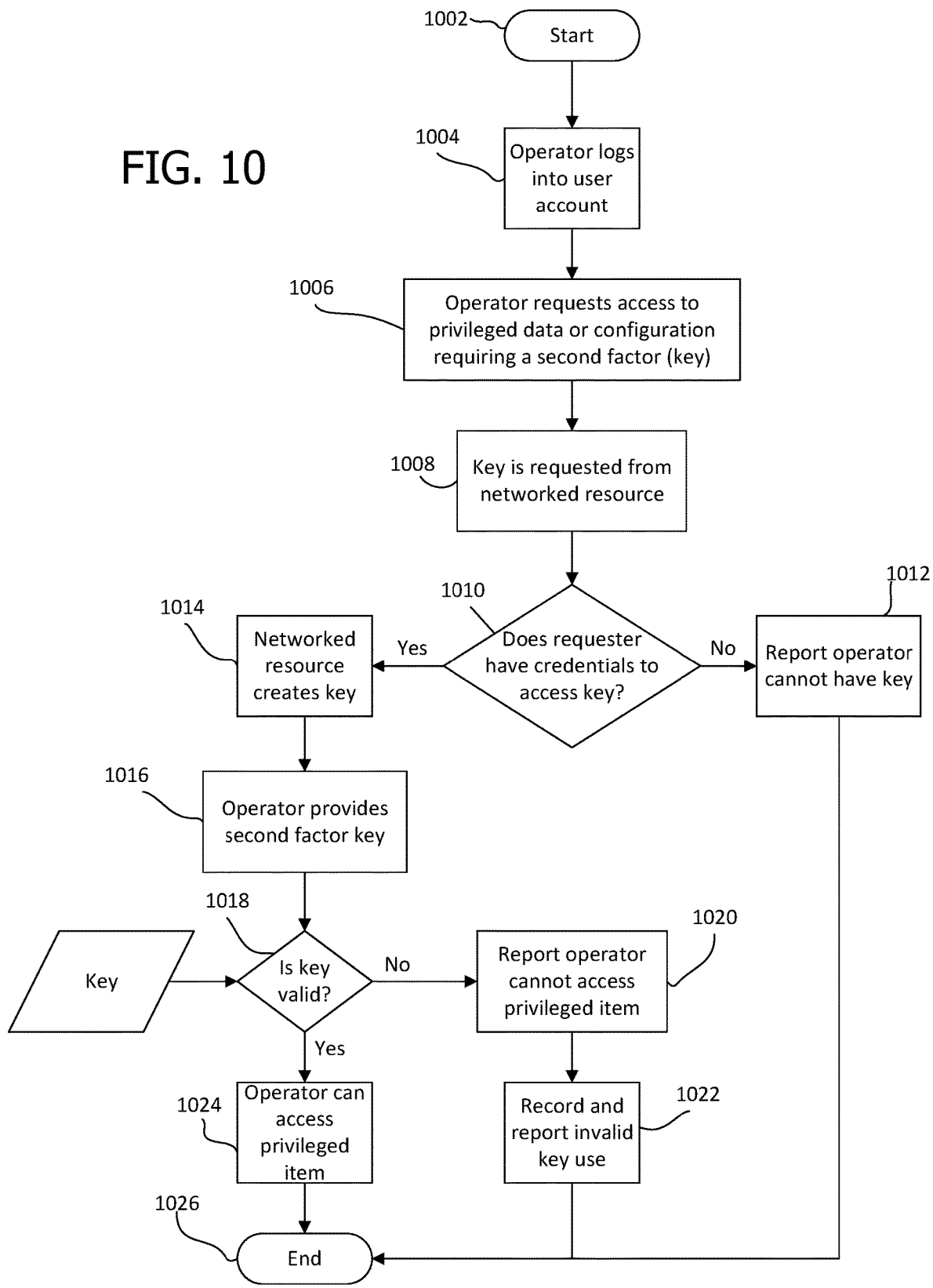

FIGS. 8-10 are flow diagrams illustrating example processes for performing the use cases of FIGS. 4-7.

The example process of FIG. 8 begins at 802 and proceeds to a sub-process step at 804 for an administrator (e.g., user 402) to login to RTU 104 or other industrial asset using HMI 116. In the illustrated embodiment, the administrator creates time-limited or limited use key credentials at 806 and modifies operations or data for which a key is required at 808. The administrator then logs out of RTU 104 at 810, thus securing RTU 104 and requiring multi-factor authentication. The example process of FIG. 8 ends at 812.

The example process of FIG. 9, which begins at 902, performs multi-factor authentication according to an embodiment. At 904, an operator (e.g., user 402) logs into a user account and, at 906, initiates operation to access privileged data or configuration requiring a second factor (key). The operator provides a second factor key file using a physical media or local network at 908. If the provided key is not valid, as determined at 910, the process reports at 912 that the operator cannot access privileged item. The process then records and reports the invalid key use at 914. If the provided key is valid, as determined at 910, the operator is granted access to the privileged item at 916. The example process of FIG. 9 ends at 918.

The example process of FIG. 10 begins at 1002. At 1004, an operator (e.g., user 402) logs into a user account and, at 1006, requests access to privileged data or configuration requiring a second factor (key). The key is then requested at 1008 from a networked resource. If the requestor does not have the proper credentials to access the key, as determined at 1010, the process reports at 1012 that the operator cannot have the key. But if the requestor does have the proper credentials to access the key, as determined at 1010, the networked resource creates the key at 1014. The operator then provides the second factor key at 1016 to gain access to the privileged item. If the provided key is not valid, as determined at 1018, the process reports at 1020 that the operator cannot access privileged item. The process then records and reports the invalid key use at 1022. If the provided key is valid, as determined at 1018, the operator is granted access to the privileged item at 1024. The example process of FIG. 10 ends at 1026.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A multi-factor authentication method for enabling secure access to an industrial asset, comprising:
   - determining a level of authentication required to access a selected operation of the industrial asset;
   - requesting two or more access credentials based on the determined level of authentication;
   - in response to receiving the requested access credentials, verifying the requested access credentials to determine if the requested access credentials match credentials required to access the selected operation, wherein verifying the requested access credentials comprises:
     - authenticating a user by a human-machine interface (HMI) using a first access credential, wherein the HMI is associated with the industrial asset, and wherein the HMI and the industrial asset are located remotely from each other; and
     - authenticating the user by the industrial asset using a second access credential:
   - in response to the requested access credentials matching the credentials required to access the selected operation, enabling access to the selected operation by the user, wherein enabling access by the user to the selected operation comprises enabling secure access to a non-privileged portion of the selected operation in response to verifying a first access credential and enabling secure access to a privileged portion of the selected operation in response to verifying the first access credential and a second access credential; and
   - in response to the requested access credentials not matching the credentials required to access the privileged portion of the selected operation, denying access by the user to the privileged portion of the selected operation;
   - wherein the industrial asset includes a run-time mode of operation and a privileged mode of operation, the run-time mode allowing deployment of application content via local certificate, and the privileged mode allowing integrator certificate deployment via local access;
   - wherein running services of the industrial asset are dynamically restricted when the industrial asset is not in the privileged mode; and
   - wherein services requiring physical presence at the industrial asset are enabled when the industrial asset is in the privileged mode.

2. The method of claim 1, wherein the level of authentication required to access the selected operation of the industrial asset is customizable based on one or more of the following: customer preferences, firmware/software upgrades, or communication availability.

3. The method of claim 1, wherein the industrial asset includes at least one of: a remote terminal unit (RTU), a programmable logic controller (PLC), a multivariable transmitter (MVT), or a sensor.

4. The method of claim 1, further comprising receiving at least one of the requested access credentials via physical storage media.

5. The method of claim 1, wherein verifying the requested access credentials comprises executing a multi-factor authentication system.

6. The method of claim 1, wherein requesting the access credentials comprises requesting and validating a first access credential before requesting a second access credential.

7. The method of claim 1, wherein the selected operation includes the privileged mode of operation associated with the industrial asset.

8. The method of claim 1, further comprising receiving, via the HMI, a request to access the selected operation of the industrial asset, wherein requesting the access credentials is responsive to the request to access the selected operation.

9. The method of claim 1, further comprising, in response to the requested access credentials not matching the credentials required to accessing the selected operation, logging an instance of denying access to the selected operation by the user and generating a report representative thereof.

10. A system for enabling secure access to a selected operation of an industrial asset, comprising:
    - an industrial asset having a privileged operational mode and a run-time operational mode, the privileged operational mode requiring a higher level of authentication than the run-time operational mode, wherein the runtime operational mode allows deployment of application content with local certificate authentication and the privileged operational mode allows integrator certificate deployment via local access; and
    - a computing device communicatively coupled to the industrial asset, the computing device configured to enable secure access to a portion of the selected operation in response to verifying a first access credential for performing one or more functionalities associated with the run-time operational mode and to enable secure access to another portion of the selected operation in response to verifying a second access credential for performing one or more functionalities associated with the privileged operational mode in response to verification of two or more access credentials;
    - wherein the computing device comprises a human-machine interface (HMI) associated with the industrial asset, wherein the HMI is configured to authenticate a user using the first access credential, wherein the industrial asset is configured to authenticate the user using the second access credential, and wherein the HMI and the industrial asset are located remotely from each other;
    - wherein running services of the industrial asset are dynamically restricted when the industrial asset is not in the privileged operational mode; and
    - wherein services requiring physical presence at the industrial asset are enabled when the industrial asset is in the privileged operational mode.

11. The system of claim 10, wherein the level of authentication required to access the privileged operational mode of the industrial asset is customizable based on one or more of the following: customer preferences, firmware/software upgrades, or communication availability.

12. The system of claim 10, wherein the industrial asset includes at least one of: a remote terminal unit (RTU), a programmable logic controller (PLC), a multivariable transmitter (MVT), or a sensor.

13. The system of claim 10, further comprising an external physical storage media storing at least one of the access credentials.

14. The system of claim 10, further comprising a multi-factor authentication system communicatively coupled to the industrial asset and the computing device for distributing at least one of the access credentials.

15. The system of claim 10, wherein the industrial asset includes an embedded processing device configured to access a selected operation of the privileged operational mode via at least one of a wired protocol, a wireless protocol, or a human machine interface.

16. The system of claim 10, further comprising a biometric data reader configured to receive biometric data from a user and to generate at least one of the access credentials based thereon.

17. The system of claim 16, wherein the biometric data reader is a fingerprint reader.

* * * * *